United States Patent
Li

(10) Patent No.: US 7,511,247 B2
(45) Date of Patent: Mar. 31, 2009

(54) METHOD OF CONTROLLING HOLE SHAPE DURING ULTRAFAST LASER MACHINING BY MANIPULATING BEAM POLARIZATION

(75) Inventor: Ming Li, Chelmsford, MA (US)

(73) Assignee: Panasonic Corporation, Osaka (JP)

( * ) Notice: Subject to any disclaimer, the term of this patent is extended or adjusted under 35 U.S.C. 154(b) by 356 days.

(21) Appl. No.: 10/805,846

(22) Filed: Mar. 22, 2004

(65) Prior Publication Data

US 2005/0205538 A1 Sep. 22, 2005

(51) Int. Cl.
*B23K 26/073* (2006.01)
(52) U.S. Cl. .......................... 219/121.61; 219/121.73; 347/224; 430/1
(58) Field of Classification Search .................
219/121.61–121.73, 121.85; 372/27
See application file for complete search history.

(56) References Cited

U.S. PATENT DOCUMENTS

| | | | | |
|---|---|---|---|---|
| 4,397,527 A | * | 8/1983 | Geyer | 359/497 |
| 4,634,831 A | * | 1/1987 | Martinen et al. | 219/121.74 |
| 4,908,493 A | * | 3/1990 | Susemihl | 219/121.67 |
| 5,293,389 A | * | 3/1994 | Yano et al. | 372/30 |
| 5,412,473 A | * | 5/1995 | Rosencwaig et al. | 356/451 |
| 5,637,243 A | * | 6/1997 | Sato et al. | 219/121.67 |
| 6,381,259 B2 | * | 4/2002 | Cordingley et al. | 372/106 |
| 6,433,301 B1 | * | 8/2002 | Dunsky et al. | 219/121.67 |
| 6,469,275 B2 | * | 10/2002 | Dulaney et al. | 219/121.85 |
| 6,555,781 B2 | | 4/2003 | Ngoi et al. | |
| 6,951,627 B2 | * | 10/2005 | Li et al. | 264/400 |
| 6,992,026 B2 | * | 1/2006 | Fukuyo et al. | 438/797 |
| 7,125,761 B2 | * | 10/2006 | Tanaka | 438/166 |
| 2002/0141473 A1 | | 10/2002 | Cordingley et al. | |
| 2002/0170898 A1 | | 11/2002 | Ehrmann et al. | |

(Continued)

FOREIGN PATENT DOCUMENTS

EP 1 338 371 A 8/2003

(Continued)

OTHER PUBLICATIONS

R. Dorn et al., Annual Report of the Chair for Optics 2002 of the Institute for Optics, Information and Photonics at the University of Erlangen-Nurnberg, p. 37.

(Continued)

*Primary Examiner*—Samuel M Heinrich
(74) *Attorney, Agent, or Firm*—RatnerPrestia

(57) ABSTRACT

A method for controlling the shape of the area machined by a pulse of laser light on a surface, such that the shape has a desired elliptical shape with its major axis aligned in a desired direction and the length of this major axis is less than or equal to a diameter of a beam spot. The pulse is generated and focused to the beam spot within a target area. The polarization of the pulse is adjusted to be elliptically polarized with an axis of the polarization ellipse oriented in the desired direction. The ellipticity of the polarization of the pulse is adjusted such that the pulse of laser light has contours of constant machining capacity on the workpiece surface, which have a similar shape to the desired shape. The fluence of the pulse light is controlled such that the area machined by the pulse is substantially the desired shape.

4 Claims, 11 Drawing Sheets

U.S. PATENT DOCUMENTS

2003/0201578 A1    10/2003    Li et al.
2005/0120803 A1*    6/2005    Sokol et al. .................. 73/801
2005/0184037 A1*    8/2005    Fukuyo et al. ......... 219/121.72

FOREIGN PATENT DOCUMENTS

JP          357097886 A *    6/1982
JP          404253588 A *    9/1992

OTHER PUBLICATIONS

R. Dorn, S. Quabis, P. Udah, G. Leuchs, "Linear Polarization Leads to Non-Circular Focal Spots", Annual Report of the Chair for Optics '02 of the Institute for Optics, Information and Photonics at the University of Erlangen-Nurnberg, 2002, p. 37, XP008048647.

Annex to Form PCT/ISA/206—Results of partial international search, PCT/US2005/008415, mailed from the International Searching Authority on Jul. 27, 2005.

* cited by examiner

METHOD OF CONTROLLING HOLE SHAPE DURING ULTRAFAST LASER MACHINING BY MANIPULATING BEAM POLARIZATION

FIELD OF THE INVENTION

The present invention concerns a method for micro- and nano-machining of features of various shapes using ultrafast laser pulses. This method may also allow the laser machining of expanded beam mode and elliptical mode shifting waveguide structures.

BACKGROUND OF THE INVENTION

As products get smaller and smaller, there is greater demand for micro-electrical-mechanical systems (MEMS), micro-optical devices and photonic crystals. With this demand, there is an associated increased interest in micro- and nano-machining. There are numerous possible applications for MEMS. As a breakthrough technology, allowing unparalleled synergy between previously unrelated fields such as biology and microelectronics, many new MEMS applications have emerged and many more may emerge in the near future, expanding beyond those currently identified or known. Additional applications in quantum electric devices, micro-optical devices and photonic crystals are also emerging.

Here are a few applications of current interest:

Quantum Electrical Devices

Interest in ideas such as quantum computing have lead to the development of devices requiring increasing smaller dimensions, such as cellular automata and coupled quantum dot technologies. Resonant tunneling devices such as resonant tunneling diodes, which may utilize quantum effects of transmission electrons to increase the efficiency of microwave circuits, require particularly fine features.

Micro-Optics

The application of micro-machining techniques to optics has led to numerous advances in optical fabrication such as gray scale technology. Gray scale technology allows for the creation of a wide variety of shapes allowing for the best optical performance achievable. Traditional binary optics rely on a "stair step" shaped approximation of the ideal surface shape. Gray scale can actually create that ideal shape. Curves, ramps, torroids, or any other shape is possible. Multi-function optics, microlens arrays, diffusers, beam splitters, and laser diode correctors may all benefit from the use of gray scale technology. These optical devices as well as others, including fine pitch gratings for shorter and shorter wavelength light, benefit from increased precision available using micro-machining. Optical MEMS devices including beam shapers, continuous membrane deformable mirrors, moving mirrors for tunable lasers, and scanning two axis tilt mirrors have also emerged due to progress in micro-machining technology.

Photonic Crystals

Photonic crystals represent an artificial form of optical material that may be used to create optical devices with unique properties. Photonic crystals have many optical properties that are analogous to the electrical properties of semiconductor crystals and, thus, may also allow the development of optical circuitry similar to present electrical semiconductor circuitry. The feature sizes used to form photonic crystals and the precise alignment requirements of these features complicate manufacture of these materials. Improved alignment techniques and reduced minimum feature size capabilities for micro-machining systems may lead to further developments in this area.

Biotechnology

MEMS technology has enabling new discoveries in science and engineering such as: polymerase chain reaction (PCR) microsystems for DNA amplification and identification; micro-machined scanning tunneling microscope (STM) probe tips; biochips for detection of hazardous chemical and biological agents; and microsystems for high-throughput drug screening and selection.

Communications

In addition to advances that may result from the use of resonant tunneling devices, high frequency circuits may benefit considerably from the advent of RF-MEMS technology. Electrical components such as inductors and tunable capacitors made using MEMS technology may perform significantly better compared to present integrated circuit counterparts. With the integration of such components, the performance of communication circuits may be improved, while the total circuit area, power consumption and cost may be reduced. In addition, a MEMS mechanical switch, as developed by several research groups, may be a key component with huge potential in various microwave circuits. The demonstrated samples of MEMS mechanical switches have quality factors much higher than anything previously available. Reliability, precise tuning, and packaging of RF-MEMS components are to be critical issues that need to be solved before they receive wider acceptance by the market.

Advances in micro-optics and the introduction of new optical devices using photonic crystals may also benefit communications technology.

Accelerometers

MEMS accelerometers are quickly replacing conventional accelerometers for crash air-bag deployment systems in automobiles. The conventional approach uses several bulky accelerometers made of discrete components mounted in the front of the car with separate electronics near the air-bag. MEMS technology has made it possible to integrate the accelerometer and electronics onto a single silicon chip at $\frac{1}{5}$ to $\frac{1}{10}$ of the cost of the conventional approach. These MEMS accelerometers are much smaller, more functional, lighter, and more reliable as well, compared to the conventional macro-scale accelerometer elements.

Micro-circuitry

Reducing the size of electronic circuits is another area in which MEMS technology may affect many fields. As the density of components and connections increases in these microcircuits, the processing tolerances decrease.

In many applications, there are stringent requirements on feature sizes (<1000 nm in some cases). These feature size requirements may include the machining of both straight and curved line sections having a variable width. Such variable width lines may be machined by setting the beam spot and fluence of the micromachining laser to machine the narrowest section of the line and tracing along the edge of wider portions with a slight offset to produce the variable width. This method requires precise and repeatable positioning control (<10 nm in some cases) and may lead to portions of the center of the line being machined more than the corresponding edge portions. Traditionally, such positioning repeatability requirements have been difficult to meet with conventional laser micromachining methods due to hysteresis in motion stages often used for positioning.

Alternatively, the fluence of the micromachining laser may be adjusted to vary the machining width while writing the line, but this method may cause the machining depth and/or the surface quality of the machined region to vary undesirably as the width is varied. Thus, the micromachining of submicron features has been a domain predominated by electron-beam, ultraviolet beam, and X-ray lithographic machines, as well as focused ion beam machines. These high-cost techniques usually require stringent environmental conditions, such as high vacuum or clean room condition. Standard lithographic methods require a separate operation for generating multiple masks.

Beam processing techniques require a beam (laser, electron, ion, etc.) to be directed accurately at the desired location with a high degree of precision for proper processing. Only four currently available technologies (laser direct writing, focused ion beam writing, micro electric discharge machine, and photochemical etching) have this potential capability. Other techniques (for example ion beam milling) are only desirable for flat wafer processing. However, direct laser writing has additional advantages including: (1) operation in ambient air under optical illumination; (2) the capability of forming structures inside transparent materials; and (3) low materials dependence. Direct laser writing may also be used to expose photoresist as part of a lithographic technique without the need to pregenerate mask sets.

SUMMARY OF THE INVENTION

An exemplary embodiment of the present invention is a method for controlling the shape of the area laser machined by a pulse of laser light on a surface of a workpiece, such that the controlled shape has a desired elliptical shape with its major axis aligned in a desired direction and the length of this major axis is less than or equal to a diameter of a beam spot of the pulse of laser light. The pulse of laser light is generated and focused to the beam spot within a target area of the microstructure workpiece. The polarization of the pulse of laser light is adjusted such that, in the beam spot, the pulse of laser light is elliptically polarized and an axis (major or minor) of the polarization ellipse of the pulse of laser light is oriented in the desired direction. The ellipticity of the polarization of the pulse of laser light is adjusted such that the pulse of laser light has contours of constant machining capacity on the surface of the microstructure workpiece, which have a substantially similar shape to the desired elliptical shape. The fluence of the focused pulse of laser light in the beam spot is controlled such that the area of the surface of the workpiece laser machined by the pulse of laser light is substantially the desired elliptical shape.

Another exemplary embodiment of the present invention is a method for laser machining a feature on a surface of a microstructure workpiece, which has a variable, submicron width substantially perpendicular to its center line. A plurality of pulses of laser light are generated and focused to a beam spot within the target area of the microstructure workpiece. The fluence of the beam spot in the target area is controlled such that the diameter of the area of the target area machined by a circularly polarized pulse of laser light is substantially equal to the minimum width of the feature perpendicular to its center line. The position of the center of the beam spot is controlled within the target area so as to follow the center line of the feature. The polarization of the focused pulses of laser light incident on the microstructure workpiece is controlled such that the area of the surface of the microstructure workpiece machined by one pulse of laser light has a substantially elliptical shape with its major axis substantially perpendicular to the center line at the incidence point of the center line corresponding to the center of the beam spot for that pulse. Also the length of the major axis of the substantially elliptical shape machined by the pulse of laser light is substantially equal to the width of the feature perpendicular to the center line at the corresponding incidence point.

An additional exemplary embodiment of the present invention is a method for laser machining a feature within a substantially transmissive microstructure workpiece, which has a substantially elliptical cross-section perpendicular to its center line. A plurality of pulses of laser light are generated and focused to form a beam waist within the target area of the substantially transmissive microstructure workpiece. The alignment and position of the beam waist within the target area are controlled such that the direction of propagation of each pulse of laser light is substantially parallel to the center line of the feature at the point on the center line corresponding to the center of the beam waist as the center of the beam waist substantially follows the center line from one end to the other. The polarization of one pulse laser light is controlled within the target area such that the one pulse has surfaces of constant machining capacity in the beam waist that have a cross-sectional shape perpendicular to the direction of propagation of the pulse which is substantially confocal to the substantially elliptical cross-section of the feature at the point on the center line corresponding to the center of the beam waist during the pulse. The fluence of the pulse in the beam waist is controlled such that the region of the target area machined by the pulse substantially matches the substantially elliptical cross-section of the feature perpendicular to the center line at the point corresponding to the center of the beam waist.

A further exemplary embodiment of the present invention is a method for storing data on a surface with a plurality of marks formed by laser machining. Each of the marks has a desired elliptical shape with its shape major axis aligned in one of a respective number of directions greater than one. The data is encoded into a sequence of directions selected from the number of directions. A plurality of pulses of laser light are generated and focused to form a beam spot on the surface. The polarization and fluence of the plurality of focused pulses of laser light incident on the surface is adjusted such that each pulse of laser light has a polarization ellipse with a predetermined ellipticity greater than zero and an area of the surface laser machined by each pulse of laser light is substantially the desired elliptical shape. The beam spot is scanned across the surface such that each focused pulse of laser light machines a separate position on the surface. The polarization ellipses of the focused pulses of laser light incident on the surface are rotated such that the polarization major axis of the polarization ellipse of each focused pulse of laser light is substantially aligned, in sequence, to one of the directions corresponding to one of the sequence of directions encoded to represent the data.

Yet another exemplary embodiment of the present invention is a method for storing data on a surface with a plurality of marks formed by laser machining. Each of the marks has an elliptical shape with its shape axis aligned in one direction and an ellipticity selected from a respective number of ellipticities greater than one. The data is encoded into a sequence of ellipticities selected from the number of ellipticities. A plurality of pulses of laser light are generated and focused to form a beam spot on the surface. The polarization and fluence of the focused pulses of laser light incident on the surface are adjusted such that each pulse of laser light has a polarization ellipse with a polarization major axis aligned to the predetermined direction. The beam spot is scanned across the surface such that each focused pulse of laser light machines a separate position on the surface. The ellipticity of the polarization ellipse of the focused pulses of laser light incident on the surface is changed such that the polarization ellipticity of the polarization ellipse of each focused pulse of laser light is substantially set, in sequence, to one of the ellipticities corresponding to one of the sequence of ellipticities encoded to represent the data.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawing are the following figures.

DETAILED DESCRIPTION OF THE INVENTION

Figure 1:
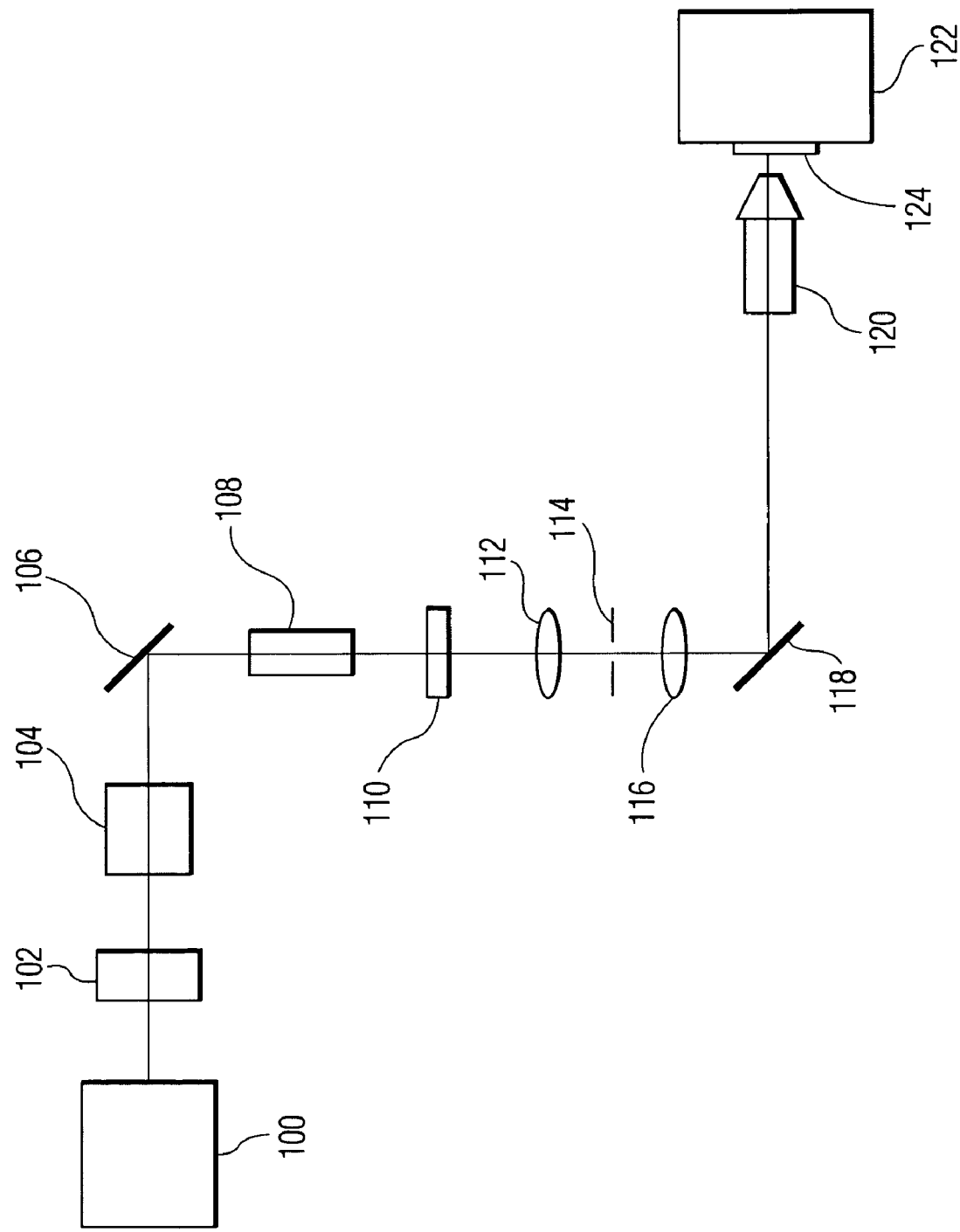
FIG. 1 is a block diagram of an exemplary laser micromachining system that may be used in exemplary methods of the present invention.

FIG. 1 illustrates a simplified block diagram of an exemplary laser micro-machining system according to the present invention. This exemplary system includes: ultrafast laser source 100; shutter 102; variable attenuator 104; dichroic mirrors 106 and 118; linear polarization rotator 108; rotatable quarter wave plate 110; lenses 112, 116, and 120; mask 114; and workpiece holder 122. The optical beam path of the exemplary micro-machining laser system is shown as a dotted line.

In this exemplary system, ultrafast laser source 100 may desirably include any type of gain medium typically used for ultrafast laser machining applications, such as: a solid state gain material, laser dye gain material, and/or gaseous gain material, including excimer gases. Harmonic generating crystals and/or amplifiers may be used within this component. Ultrafast laser source 100 desirably produces nearly Fourier-transform limited pulses having a duration of less than about 1 ns, typically less than 1 ps. Desirably, a frequency-doubled, 150 fs Ti:Sapphire laser (for example a Clark MXR CPA2000) may be used as the laser. Ultrafast laser source 100 may also desirably include optics to control the collimation of its laser beam output. Shutter 102 is used to control the laser output (i.e. open during machining and closed to block the beam when not machining). This may extend the life of other components in the exemplary micromachining system.

Variable attenuator 104 desirably allows for fine control of the pulse energies, and thus the beam fluence. Variable attenuator 104 is desirably a polarization type of controllable variable attenuator that may withstand the high peak powers associated with ultrafast lasers. For example a pair of linear polarizing members arranged on either side of a controllable polarization rotation element such as a Pockels cell, Kerr cell, or a liquid crystal. Alternatively, a fixed linear polarizing member and a rotatable polarization member may be used as variable attenuator 104. The resulting control of pulse energies is desirable for machining features which are smaller than the minimum spot size that may be achieved for light of a particular wavelength. In the case of an ultrafast micromachining laser, it is possible to micro-machine fine features even smaller than the diffraction limited size of the beam spot, as described in published US Patent Application US-2003-0201578-A1, METHOD OF DRILLING HOLES WITH PRECISION LASER MICROMACHINING, by M. Li et al.

In the exemplary micro-machining laser system of FIG. 1, variable attenuator 104 also desirably produces laser light linearly polarized in a known direction. This is because linearly polarized light is desirable as the input light for the polarization control system (linear polarization rotator 108 and rotatable quarter wave plate 110) shown in FIG. 1. Although this exemplary polarization control system uses linearly polarized input light, it may be understood by one skilled in the art that input light having other polarizations may be used, as long as the polarization of the input light is known, with minor changes to the elements of polarization control system. It is also noted that a fixed linear polarizer (not shown) may be added before linear polarization rotator 108.

Desirably, both mirror 106 and mirror 118 are dichroic mirrors designed to have a high reflectivity (>95%) throughout the bandwidth of the laser pulses, as well as desirably minimal absorption near the peak wavelength of ultrafast laser source 100. These dichroic mirrors are desirably formed of a large number of dielectric layers, with thicknesses on the order of the peak wavelength of the pulses of laser light generated in ultrafast laser source 100. The broader the desired high reflectivity bandwidth of these dichroic mirrors, the more complex this layered dielectric structure becomes. Thus, it is desirable to substantially maintain the bandwidth of these pulses near their Fourier-transform limit.

This pair of dichroic mirrors, 106 and 118, allows steering of the UV laser beam. Dichroic mirror 118 is desirably polarization preserving, so as not to alter the polarization of the laser light pulses transmitted from the polarization control system, but any known polarization changes due to dichroic mirror 118 may be compensated by the polarization control system. Dichroic mirror 118 also desirably allows the visible light to be efficiently transmitted for illuminating and imaging the workpiece using a visible light monitoring system (not shown).

Linear polarization rotator 108 is desirably a controllable polarization rotation element that functions as a rotatable half wave plate, which may be used to controllably rotate the polarization direction of the attenuated laser pulses transmitted by variable attenuator 104 to a desired angle. Linear polarization rotator 108 may desirable be a half wave plate that may be physically rotated or may be an electro-optical device, such as a Pockels cell, a Kerr cell, or a liquid crystal that may rotate the polarization direction of light a controlled amount based on an applied electric field. Rotatable quarter wave plate 110 then transforms the polarization of the pulses of laser light to have an elliptical polarization.

Elliptical polarization is used in its general sense in the present invention, i.e. to include linear and circular polarization as special instances in which the ellipticity of the polarization ellipse equals 1 and 0, respectively. Linear polarization rotator 108 may desirably rotate the polarization of the pulses of laser light through range of 180°. Rotatable quarter wave plate 110 is desirably rotatable though a range of 90°. The 90° rotational range of rotatable quarter wave plate 110 allows one or the other of the axes of the polarization ellipse to be set to any angle. The 180° range of polarization angle rotation allowed by linear polarization rotator 108 permits selection of either axis of the polarization ellipse as the major axis and for the ellipticity of the polarization ellipse to be varied from 0 to 1 for all settings of rotatable quarter wave plate 110. This combination allows all possible elliptical polarizations to be achieved. It is noted that, in the exemplary embodiment in which linear polarization rotator 108 is a physically rotatable half wave plate, the polarization direction of the attenuated laser pulses rotates two degrees for every degree that the half wave plate is rotated. Thus, if two physically rotatable wave plates are used for the polarization control system, both wave plates desirably have a 90° range of rotation.

The elliptically polarized pulses may be focused by lens 112 through a pinhole in mask 114 and then re-collimated by lens 116. The pinhole may be used as the object to form a reduced image on the surface of workpiece 124. Lenses 112 and 116 have desirably low absorptivity and low chromatic aberration within the bandwidth of the laser light pulses.

The laser beam is then directed by dichroic mirror 118 into lens 120 which focuses the beam onto a target area on the surface of workpiece 124 that is held in place by workpiece holder 122. It is noted that lens 120 may be desirably a microscope objective, a single lens, or composed of several separate optical elements, although this last alternative may complicate alignment of the system. Whichever alternative is used the element also desirably has low absorptivity and low chromatic aberration within the bandwidth of the laser light pulses. The elliptically polarized laser light pulses may be focused on the surface of the workpiece in a diffraction limited, or nearly diffraction limited, spot to allow machining of a minimum feature size.

Workpiece holder 122 desirably includes a computer-controlled XYZ motion stage with micrometer resolution (for example, a micron resolution XYZ motion stage manufactured by Burleigh). A computer-controlled, piezo-electric XY motion stage with nanometer-resolution (for example, a piezo-electric XY motion stage manufactured by Queensgate) may be used with, or in place of, the XYZ motion stage. Focusing of the laser light pulses may be achieved by moving workpiece 124 nearer to or farther from lens 120 using the XYZ motion stage. These one or two computer-controlled motion stages of workpiece holder 122 may be used to align the beam spot of the laser micro-machining system on the surface of workpiece 114, with the micrometer resolution XYZ motion stage providing coarse positioning and the piezo-electric motion stage providing fine positioning. Workpiece holder 122 may also desirably include a computer-controlled $\phi\theta$ angular motion stage with arcminute resolution.

Alternatively, a computer-controlled, piezo-electric XY motion stage with nanometer-resolution (not shown) coupled to mask 114 may be used for fine alignment of the beam spot of the laser micro-machining system on workpiece 124. As noted, the machining beam spot size on the surface of workpiece 124 may be diffraction limited. A pinhole in mask 114 may be larger than the desired machining beam spot size and the focal lengths of lenses 116 and 120 may be selected to provide a reduced image of the pinhole as the machining beam spot. If the beam size at mask 114 is larger than the pinhole, moving the pinhole within the focused laser beam, may allow the beam spot formed on the surface of workpiece 124 to be moved by a scaled amount, thereby increasing the ultimate precision of the beam spot alignment. This scaling is based on the ratio of the pinhole size to the machining spot size, which may desirably be 10:1 or greater. With a 10:1 ratio and using a computer-controlled, piezo-electric XY motion stage with nanometer-resolution to move the mask, the positioning of the machining beam spot may be controlled with an improved precision.

It may be understood by one skilled in the art that the order of several of the elements in the exemplary laser micro-machining system of FIG. 1 may be rearranged without altering the function of the system. For example: shutter 102 may be located anywhere along the beam path of the machining laser beam from its position shown in FIG. 1 to immediately before lens 120; polarization rotator 106, and rotatable quarter wave plate 110 may be located after lens 116 or dichroic mirror 118, as may variable attenuator 104, although it is desirable for variable attenuator 104 to remain before polarization rotator 106, unless the input light for polarization rotator 106 is otherwise polarized.

Circularly polarized light has been found to produce the minimum sized, and consistently round, machining areas on workpiece surfaces, or within the body of the workpiece for laser micromachining systems in which the beam has a Gaussian 0,0 beam intensity profile. Thus, circularly polarized light may be desirable to form the smallest and most reproducible features by laser machining, as may the use of beams having substantially Gaussian beam intensity profiles. Other elliptical polarizations form laser machined areas elongated toward the major axis of the polarization ellipse that are roughly elliptical in shape. It has been found that these elongated areas substantially maintain the diameter of the round areas machined by circularly polarized pulses as the length of their minor axes.

Figure 2:
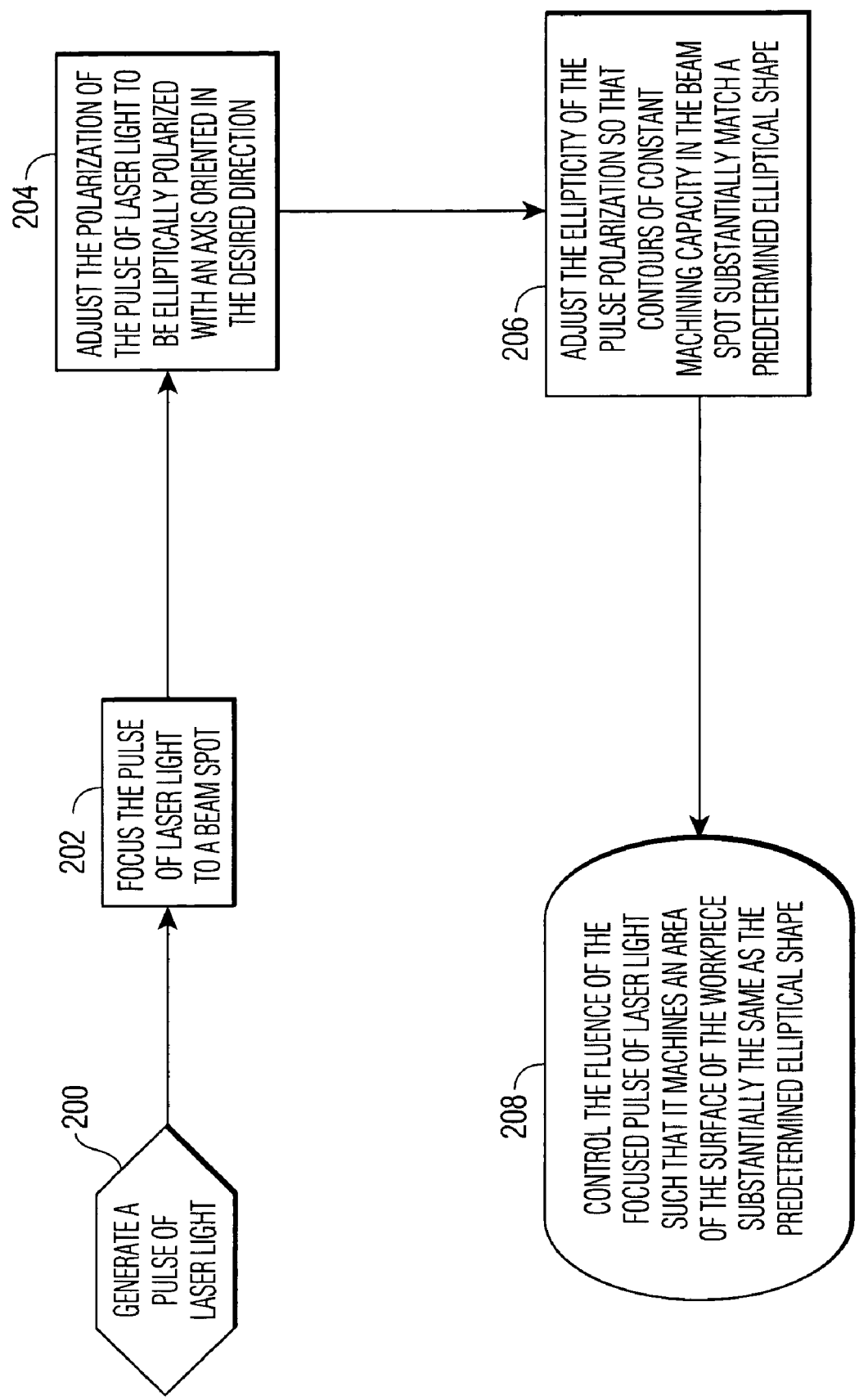
FIG. 2 is a flow chart illustrating an exemplary method of controlling the shape of an area machined by an exemplary laser micro-machining system according to the present invention.

The exemplary laser micro-machining system of FIG. 1 may be operated to allow laser machining of submicron features on pre-existing microstructures as well for manufacturing new microstructures. The mass customization of microstructures and the repair of defective microstructures may also be accomplished using this exemplary system. FIG. 2 is a flowchart illustrating an exemplary method for controlling the shape of the area laser machined by a pulse of laser light on a surface of a workpiece, according to the present invention. It is noted that the laser machining of features on the surface of a workpiece may include a number of different forms of material processing such as: ablation of the material of the workpiece to form negative structures in the workpiece; laser-assisted chemical vapor deposition on deposition material on the surface of the microstructure workpiece to form positive structures on the workpiece; the exposure of photoresist on the surface of the microstructure workpiece to assist in further processing of the workpiece; and the permanent alteration of the structure of the workpiece material, for example changing the index of refraction, altering the lattice structure, or changing the chemical composition of the workpiece material. This exemplary method may be performed using a laser micro-machining system similar to the exemplary system of FIG. 1.

In this exemplary method the shape laser machined on the surface of a workpiece may be a predetermined elliptical shape. The predetermined elliptical shape may have a major axis length less than or equal to a full width at half maximum (FWHM) of a beam spot of the pulse of laser light (<1000 nm for many exemplary micro-machining laser systems). This major axis may be desirably aligned in any desired direction.

A pulse of laser light is generated, step 200, by a pulsed laser source, such as ultrafast laser source 100 in FIG. 1. The pulse of laser light is focused to the beam spot within a target area of the microstructure workpiece, step 202. The FWHM of the beam spot may be substantially diffraction limited to allow the machining of minimum sized features. It is noted that, ideally, the edges of a laser machined area may fall near the steepest portion of the slope of the intensity profile of the beam spot. For a beam having a Gaussian intensity profile this occurs when the width of the machined area is at approximately 0.72 of the FWHM of Gaussian curve. Therefore, it may be desirable for the FWHM of the beam spot to be larger than the major axis of the desired area to be machined, preferably by a factor of close to 4/3.

Figure 3:
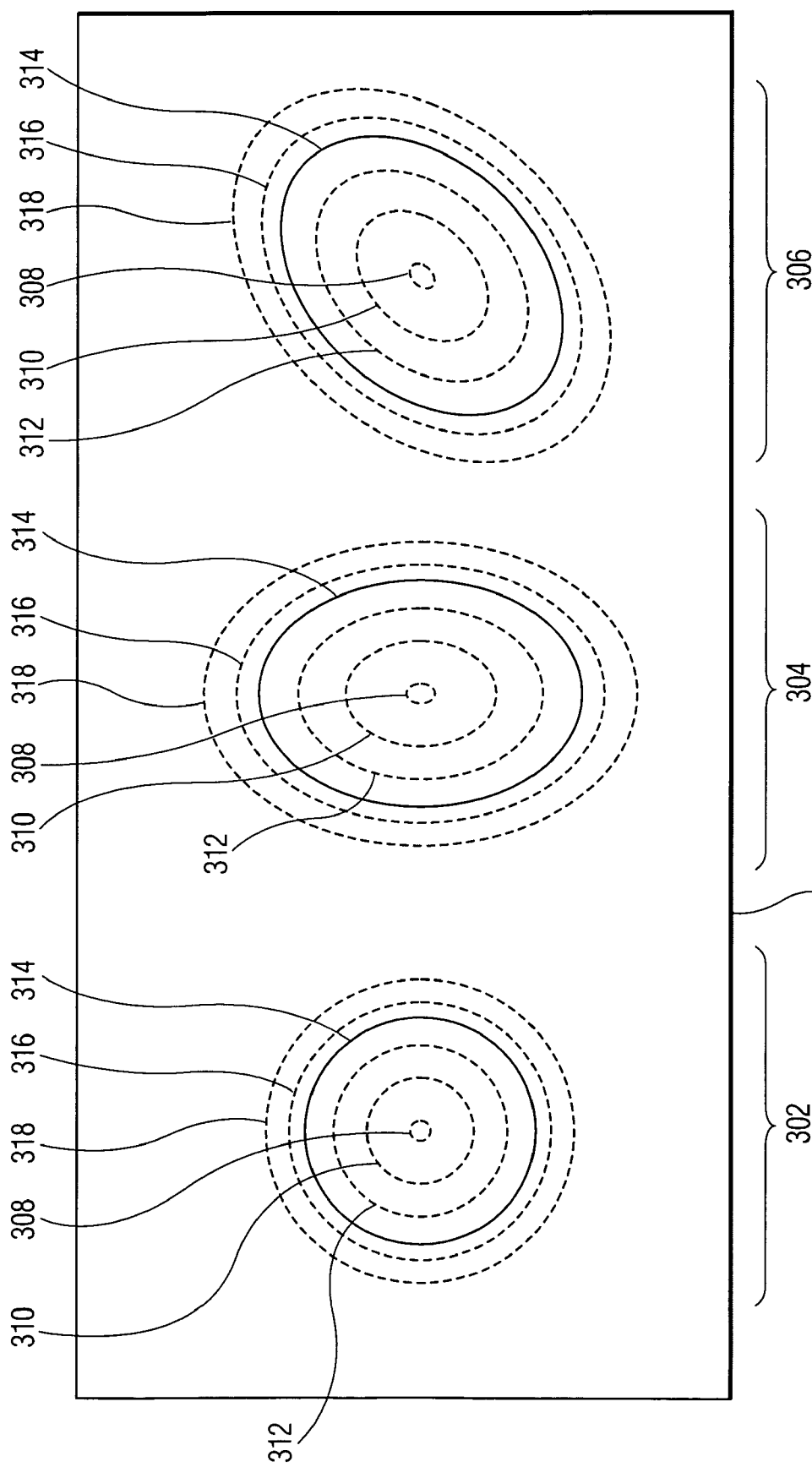
FIG. 3 a schematic representation of exemplary areas machined by an exemplary laser micro-machining system using the exemplary method of FIG. 2.

The pulse of laser light incident on the surface of the microstructure workpiece has contours of constant machining capacity that may be affected by the polarization of the laser beam. FIG. 3 illustrates contours of constant machining capacity 308, 310, 312, 314, 316, and 318 on workpiece 300 for three exemplary beam spot polarizations. Beam spot 302 illustrates contours of constant machining capacity 308, 310, 312, 314, 316, and 318 for an exemplary circularly polarized beam. In the *Annual Report of the Chair for Optics '02 of the Institute for Optics, Information and Photonics at the University of Erlangen-Nurnberg*, on page 37, R. Dorn et al. reported findings that linear polarization of a HeNe laser beam leads to a non-circular focal spot. The affect of polarization on the contours of constant machining capacity for a pulse of laser light that is not circularly polarized appears to be greater than the small change in the shape of a focal spot disclosed by Dorn et al. in their FIG. 1*a*. This enhanced eccentricity of the contours of constant machining capacity compared to the focal spot allows a wide range of substantially elliptical shapes to be machined with a single pulse of polarization controlled laser light. Beam spots 304 and 306 illustrates contours of constant machining capacity 308, 310, 312, 314, 316, and 318 for exemplary non-circular, elliptically polarized beams, the polarization ellipses of which have different major axes.

The polarization of the pulse of laser light is adjusted such that in the beam spot the pulse of laser light is elliptically polarized and an axis of a polarization ellipse of the pulse of laser light is oriented in the desired direction, step 204. In the exemplary system of FIG. 1, this adjustment of the laser pulse polarization may be accomplished by aligning the optic axis of rotatable quarter wave plate 110 in the laser beam either parallel or perpendicular to the desired direction of the area to be machined on the surface of the workpiece. The ellipticity of the polarization of the pulse of laser light may also be adjusted, step 206, such that the resulting has contours of constant machining capacity on the surface of the microstructure workpiece have a substantially similar shape to the desired elliptical shape.

In step 204 it may be desirable to adjust the polarization of the pulse of laser light such that, in the beam spot, the pulse of laser light is linearly polarized in the predetermined direction. Using the exemplary system of FIG. 1 this may be accomplished by using linear polarization rotator 108 rotate the polarization of the pulse incident on rotatable quarter wave plate 110 in synchrony with rotatable quarter wave plate 110, keeping the linear polarization aligned with the optical axis of rotatable quarter wave plate 110. In this way, the ellipticity of the polarization ellipse at the start of step 206 is always 1. A further rotation of the linear polarization vector incident on rotatable quarter wave plate 110 of 0° to 90° in the same direction allows all possible elliptical polarizations with polarizations ellipses having an axis in the desired direction.

The fluence of the focused pulse of laser light is controlled in the beam spot, step 208, such that the area of the surface of the workpiece laser machined by the pulse of laser light is substantially the predetermined elliptical shape. In FIG. 3, beam spots 302, 304, and 306 are shown with an exemplary pulse fluence selected. This exemplary control of the pulse fluences leads to contour 314 in each of these beam spots defining the edge of the area machined by the exemplary pulses of laser light.

It is noted that, for a given laser pulse, steps 202, 204, 206, and 208 occur substantially simultaneously in this exemplary method.

Figure 4:
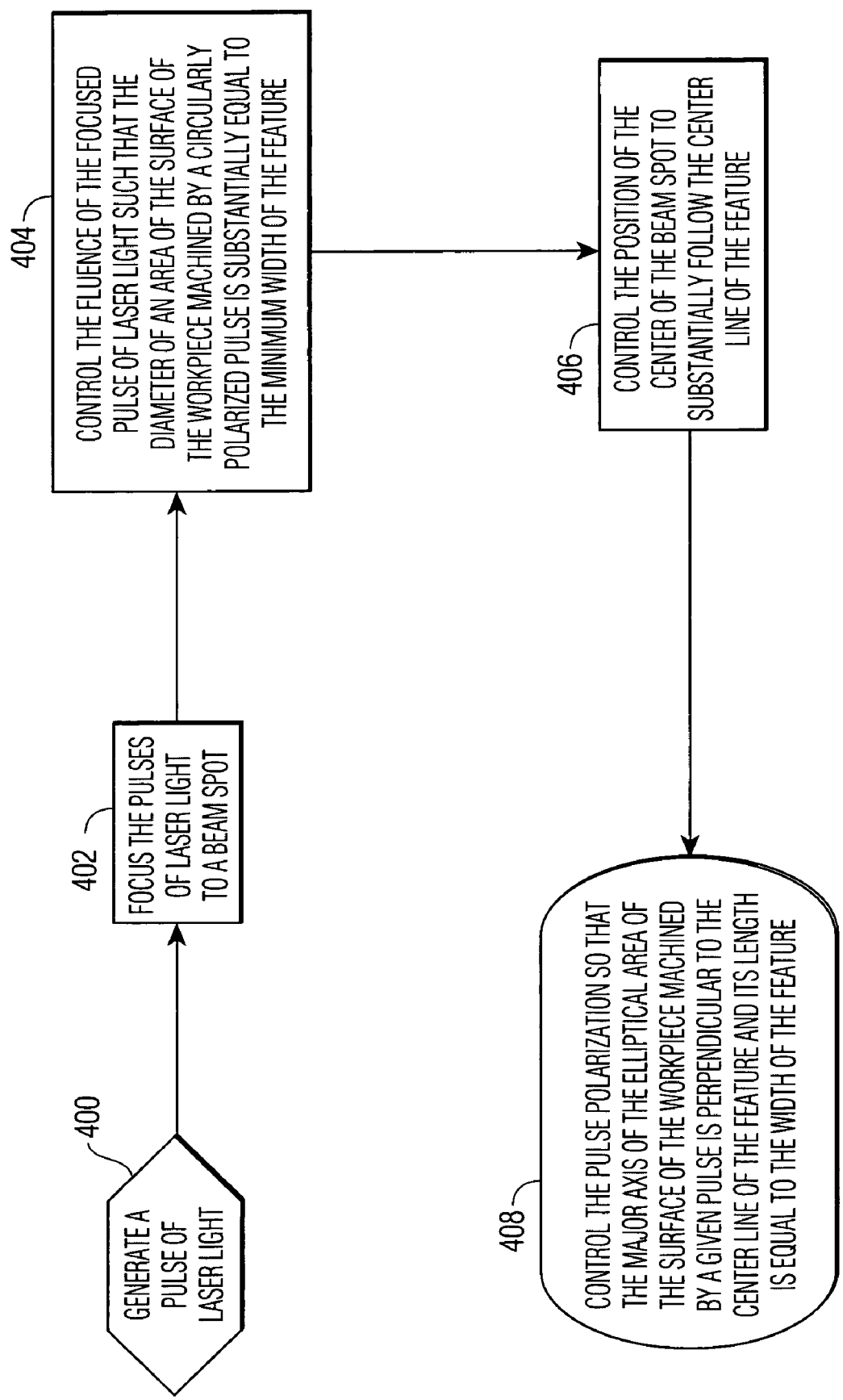
FIG. 4 is a flow chart illustrating an exemplary method of laser machining a line with a variable width on the surface of a workpiece according to the present invention.

FIG. 4 illustrates an exemplary method for laser machining a submicron width feature on a surface of a microstructure workpiece. A micromachining laser system such as the exemplary system of FIG. 1 may be used. This exemplary method allows laser machining of features that have a variable, submicron width in a direction substantially perpendicular to the center line of the feature. The exemplary method of FIG. 4 may be used to form a variety of different microstructures that may include features desirably having a variable, submicron width, including, without limitation: microstructure molds; quantum cellular automata; coupled quantum dot devices; resonant tunneling devices; multifunction optical arrays; diffractive optical elements; beam shapers; microlens arrays; optical diffusers; beam splitters; laser diode correctors; fine pitch gratings; photonic crystals; micro-electrical-mechanical systems; micro-circuitry; micro-surface-acoustic-wave devices; micro-mechanical oscillators; polymerase chain reaction microsystems; biochips for detection of hazardous chemical and biological agents; and high-throughput drug screening and selection Microsystems. This exemplary method may be particularly suited to forming features composed of straight and/or curved lines with a variable width, such as a planar waveguide section with one or more beam mode expansion sections.

Pulses of laser light are generated, step 400. These pulses of laser light may be generated using any standard pulsed micromachining laser such as an ultrafast laser or a pulsed excimer laser. The pulses of laser light are focused to a beam spot within a target area of the microstructure workpiece, step 402. The beam spot may be desirably diffraction limited, but, as described above with reference to the exemplary method of FIG. 2, the desired beam spot size is ideally based on the minimum feature size to be machined. The area machined by a pulse of the micromachining laser light is also affected by the fluence of the pulse in the beam spot. Desirably, the fluence of the beam spot in the target area is controlled such that the diameter of the area machined by a circularly polarized pulse of laser light is substantially equal to the minimum width of the feature, perpendicular to the center line of the feature, step 404.

Figure 5:
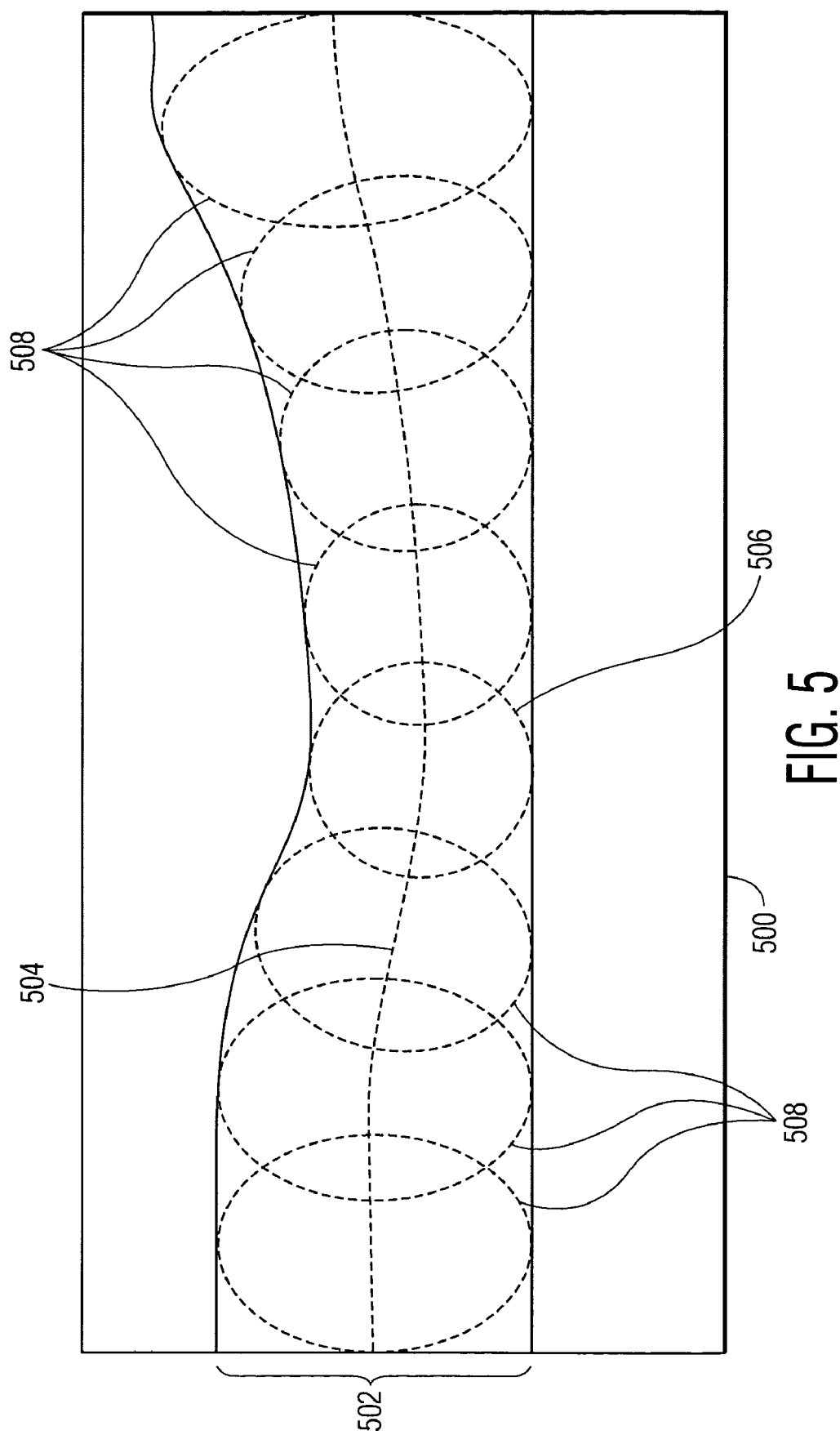
FIG. 5 a schematic representation of an exemplary line having a variable width that has been laser machined using the exemplary method of FIG. 4.

FIG. 5 illustrates feature 502, which may be machined on the surface of workpiece 500, using the exemplary method FIG. 4. Feature 502 may be a planar waveguide structure formed on top of the surface of workpiece 500 by laser-assisted chemical vapor deposition or formed along the surface of workpiece 500 by machining the workpiece material to alter its index of refraction within the feature boundaries. Dashed circle 506 illustrates the desired area to be machined by a circularly polarized pulse of laser light. As described in step 404, the minimum width of feature 502 may be used to set the fluence in the beam spot such that dashed circle 506 fits in the minimum feature width, as shown in FIG. 5. Dashed ellipses 508 illustrate exemplary desired areas to be machined by pulses of laser light during laser machining of feature 502.

During the laser machining of feature 502, the position of the center of the beam spot in controlled so as to follow center line 504 of the feature, step 406. As shown in FIG. 5 this centerline may be curved and may include straight sections as well. The position of the center of the beam spot within the target area may be desirably controlled with an accuracy of less than about 100 nm. As shown in the exemplary system of FIG. 1, the pulses of laser light propagate along a beam path that may includes pinhole mask 114 having a pinhole located in the beam path. This pinhole mask may be transversely moveable. The pulses of laser light may be focused on pinhole mask 114 and lenses 116 and 120 may function as reducing optics such that the beam spot diameter in the target area of the workpiece is smaller than the pinhole diameter of the pinhole. In this case, the position of the center of the beam spot within the target area may be controlled with great accuracy by moving the transversely moveable pinhole mask a scaled amount, which is based on the ratio of the pinhole diameter to the beam spot diameter. Alternatively, the position of the center of the beam spot within the target area may be controlled by moving the microstructure workpiece directly.

At each location along the center line of the feature, the polarization of the focused pulses of laser light incident on the microstructure workpiece is controlled, step 408. The polarization is desirably controlled such that the area of the surface machined by each pulse of laser light has a substantially elliptical shape with its major axis substantially perpendicular to the center line at an incidence point of the center line corresponding to the center of the given pulse, as illustrated by dashed ellipses 508 in FIG. 5. As shown, the lengths of the major axes of these substantially elliptical shapes are desirably equal to the width of the feature perpendicular to the center line at the incidence point.

The fluence set in step 404 may be selected such that the depth of material machined by each pulse of laser light is substantially constant. The rate at which the beam spot is scanned along the center line in step 406 may also be selected to allow depth of material machined throughout the feature to maintain a substantially constant depth.

Figure 6:
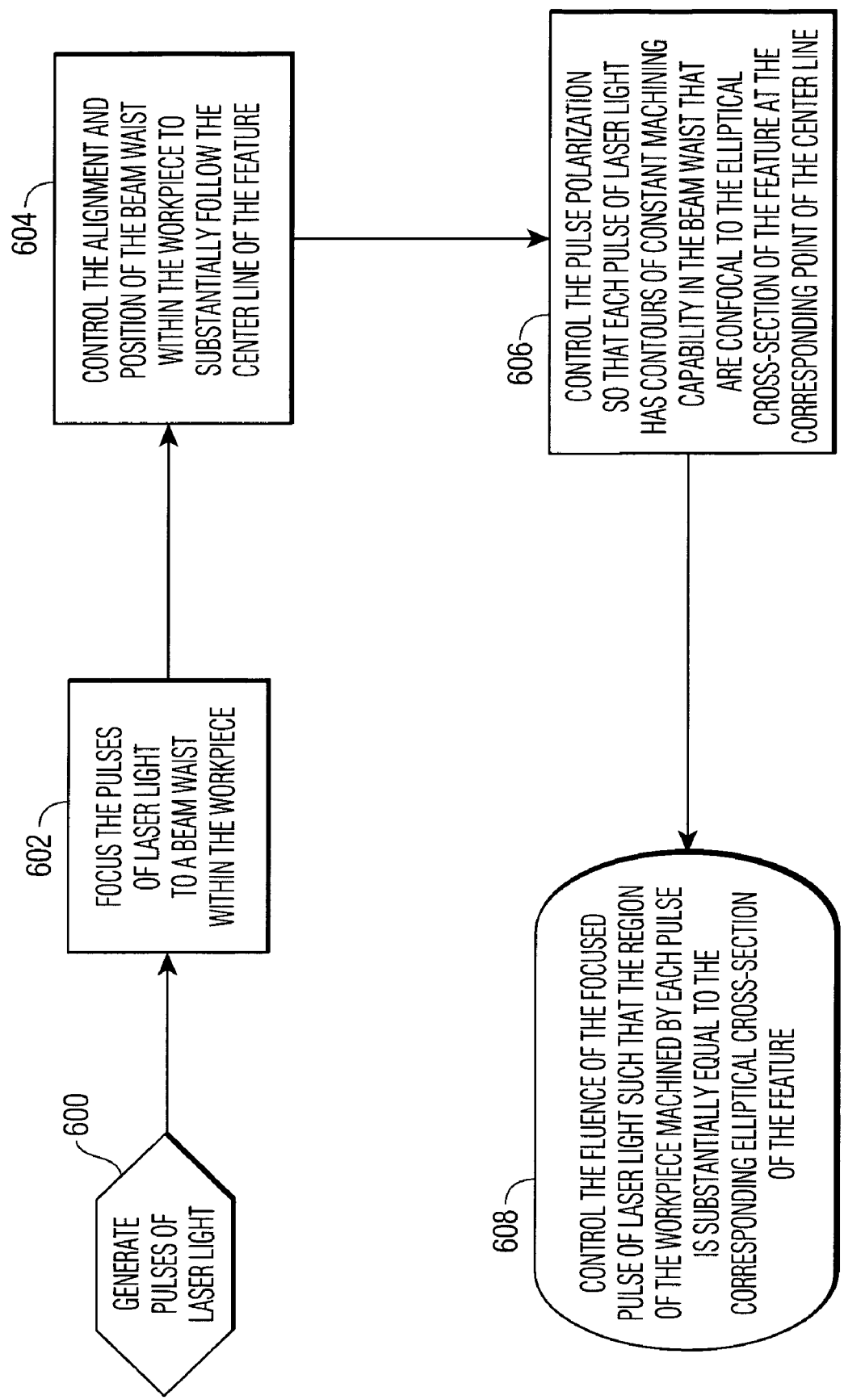
FIG. 6 is a flow chart illustrating an exemplary method of laser machining a feature with a variable cross-section within a workpiece according to the present invention.

FIG. 6 illustrates an exemplary method for laser machining a feature, which has a substantially elliptical cross-section perpendicular to its center line, within a substantially transmissive microstructure workpiece. It is noted that the laser machining of features within a substantially transmissive workpiece may include a number of different forms of material processing such as: changing the index of refraction, altering the lattice structure, or changing the chemical composition of the workpiece material. As with the other exemplary method of the present invention, this exemplary method may be performed using a laser micro-machining system similar to the exemplary system of FIG. 1.

The exemplary method of FIG. 6 may be used to form a variety of different microstructures that may include internal features having an elliptical cross-section, such as: quantum cellular automata; coupled quantum dot devices; resonant tunneling devices; multifunction optical arrays; diffractive optical elements; beam shapers; microlens arrays; optical diffusers; beam splitters; laser diode correctors; fine pitch gratings; photonic crystals; micro-electrical-mechanical systems; micro-circuitry; micro-mechanical oscillators; polymerase chain reaction Microsystems; biochips for detection of hazardous chemical and biological agents; and high-throughput drug screening and selection Microsystems. This exemplary method may be particularly suited to forming features with elliptical cross-sections having variable widths and/or orientations, such as an exemplary elliptical waveguide device with one or more beam mode expansion sections and/or polarization shifting sections.

As in the exemplary method of FIG. 4, pulses of laser light are generated, step 600. These pulses of laser light are focused to form a beam waist within a target area of the substantially transmissive microstructure workpiece, step 602. Within the beam waist the pulses of laser light have roughly ellipsoidal surfaces of constant machining capability. These surfaces are similar to the contours of constant machining capability described above, with reference to FIG. 2, for the laser machining of surfaces. Because laser machining within materials leads to these three dimensional surfaces it may desirable to use a high numerical aperture lens for focusing the laser pulses into the workpiece. This increases the angle of focusing beam and, thus, flattens the roughly ellipsoidal surfaces of constant machining capability in the direction of light propagation, which allows greater control of size and shape of the machined feature.

The alignment and position of the beam waist within the target area are controlled, step 604, such that the center of the beam waist substantially follows the center line from one end of the feature center line to the other end. As the center of the beam waist follows the center line, preferably from the deepest portion of the feature as it is mounted in the workpiece holder to its shallowest portion, the direction of propagation of each of the pulses of laser light is aligned to be substantially parallel to the center line of the feature at the point on the center line corresponding to the center of the beam waist. The position of the center of the beam waist within the target area is desirably with an accuracy of less than about 100 nm by moving the substantially transmissive microstructure workpiece.

For each of the pulses of laser light, the polarization within the target area of the microstructure workpiece is controlled, step 606. The controlled polarization of each pulse is such that the given pulse of laser light has surfaces of constant machining capacity in the beam waist with a cross-sectional shape, perpendicular to the direction of propagation of the pulse of laser light, which is substantially confocal to the substantially elliptical cross-section of the feature at the point on the center line corresponding to the center of the beam waist during the given pulse of laser light.

The fluence of each pulse of laser light in the beam waist is also controlled, step 408. This fluence control desirably causes a region of the target area to be machined by each pulse of laser light that substantially matches the desired elliptical cross-section of the feature perpendicular to the center line at the point corresponding to the center of the beam waist.

One exemplary feature that may be formed using the method of FIG. 6 is an elliptical waveguide. It is noted that, elliptical waveguides are widely used in microwave and acoustic applications because of their advantageous propagation and transmission mode properties. In the case of machining an elliptical waveguide, the first end of the center line where the laser machining begins is on a back surface of the substantially transmissive microstructure workpiece and the second end of the center line where the laser machining concludes is on a front surface of the substantially transmissive microstructure workpiece. It is noted the designations front surface and back surface are used here to denote any two surface areas of the substantially transmissive microstructure workpiece used as input/output ports for the exemplary elliptical waveguide, and, thus, these surfaces need not be parallel.

Figure 7:
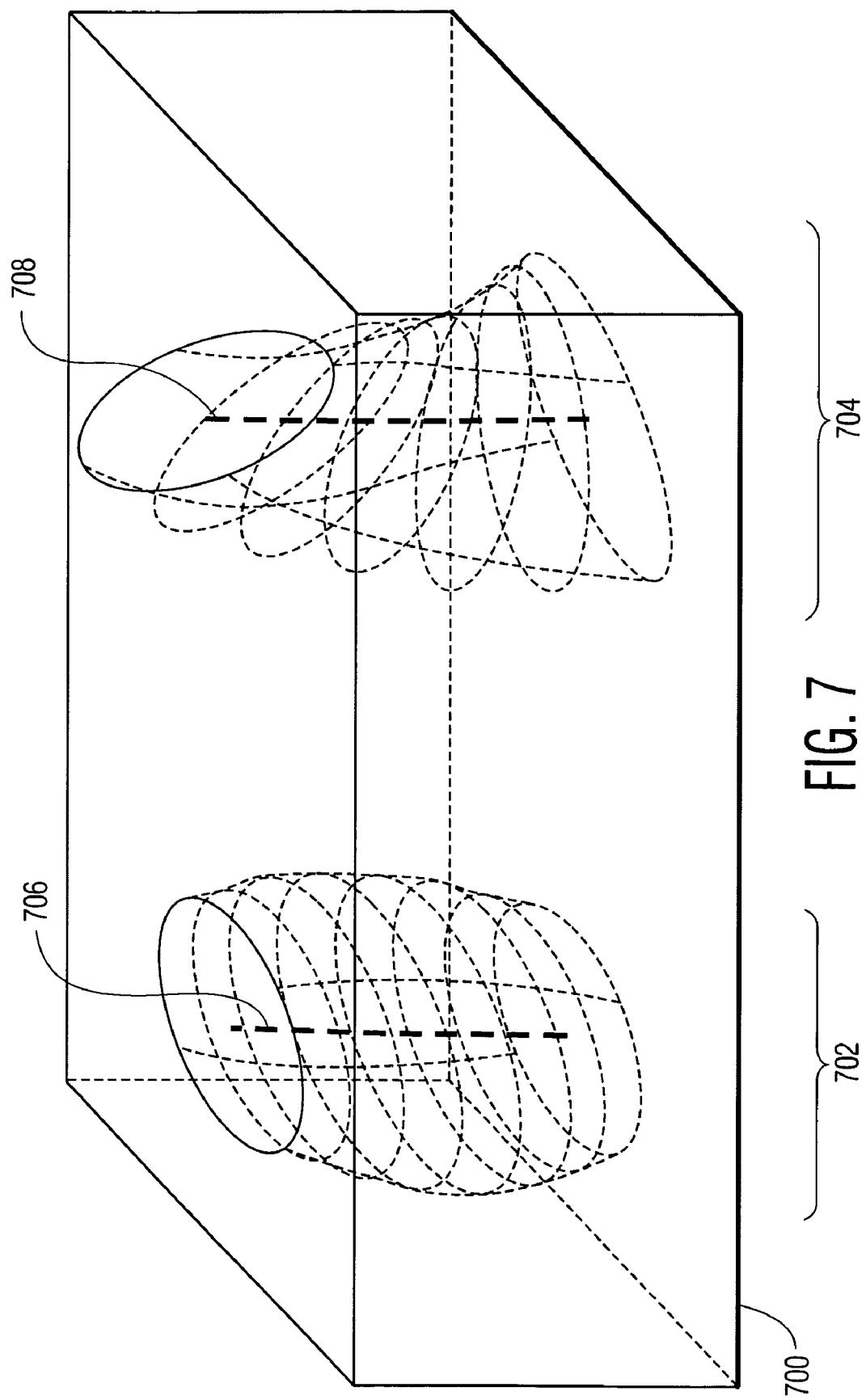
FIG. 7 a schematic representation of exemplary features with variable cross-sections laser machined using the exemplary method of FIG. 6.

FIG. 7 illustrates two exemplary waveguides 702 and 704 formed within substantially transmissive microstructure workpiece 700 by altering the index of refraction of the material within the waveguide using laser machining according to the method of FIG. 6. Dashed lines 706 and 708 illustrate the center lines of exemplary waveguide sections 702 and 704, respectively. Exemplary waveguide 702 has an elliptical cross-section with an ellipticity at or near zero (i.e. it is circular or nearly circular). The length of the major axis (or diameter for a circular cross-section) increases in the central portion of this exemplary waveguide forming beam mode expansion sections at the ends of waveguide 702. Exemplary waveguide 704 has an elliptical cross-section with a constant major axis length. The azimuth angle (i.e. the direction of the major axis of the elliptical cross-section) is varied through approximately 90° along the length of this exemplary elliptical waveguide. On a much larger scale, similar helically twisted elliptical waveguide sections have been used to control the polarization of microwaves. The exemplary method of FIG. 6 allows the laser machining of submicron dimension elliptical waveguides, such as waveguide 704, including polarization shifting sections for visible and UV applications.

The two exemplary elliptical waveguides of FIG. 7 are merely examples of two possible configurations that may be machined using the exemplary method of FIG. 6 and are not limiting. For example, although center lines 706 and 708 in exemplary waveguides 702 and 704 are straight, it is noted that waveguides having a center line that includes a curved portion may be formed using the exemplary method of FIG. 6. Also, waveguides in which the cross-sections have variable ellipticities may be formed.

Figure 8:
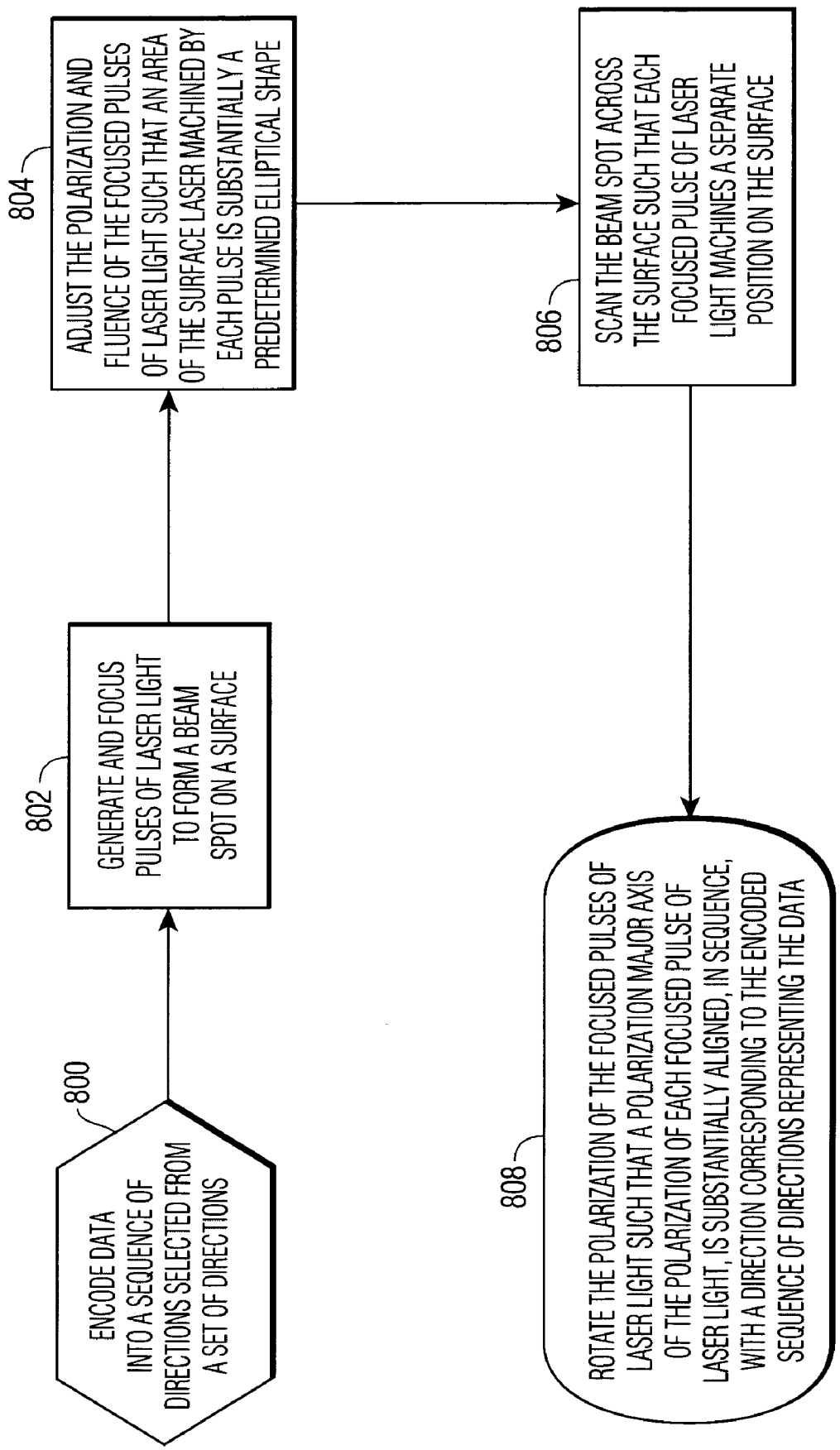
FIG. 8 is a flow chart illustrating an exemplary method of encoding data on a surface using an exemplary laser micromachining system according to the present invention.

FIG. 8 illustrates an exemplary method for storing data on a surface with marks formed by laser machining. In this exemplary method each of the marks has a predetermined elliptical shape, the major axis of which may be aligned in one of a predetermined number of directions. To achieve a maximum information density on the surface for this storage method, it may be desirable for the length of the major axis of the predetermined elliptical shape to be less than a peak wavelength of the pulses of laser light used to machine these marks.

The data is encoded into a sequence of directions (symbols) selected from the predetermined number of directions, step 800. Pulses of laser light are generated and focused to form a beam spot on the surface where the data is to be stored, step 802. The polarization and fluence of the focused pulses of laser light incident on the surface are adjusted such that the area of the surface laser machined by each pulse of laser light is substantially the predetermined elliptical shape of the marks in the code, step 804. To allow machining of non-circular marks on the surface with a single pulse, the polarization ellipse of each pulse of laser light has a predetermined ellipticity greater than zero. It may be desirable for this polarization ellipticity to be set to approximately one to achieve the maximum ellipticity in the resulting machined marks, as described above with respect to the exemplary method of FIG. 2.

The beam spot is scanned across the surface so that each focused pulse of laser light machines a separate position on the surface, step 806. As each pulse of laser light, in sequence, is focused onto the surface, its polarization ellipse incident on the surface is rotated, step 808, such that the major axis of the polarization ellipse is substantially aligned to the direction corresponding to the next one of the sequence of directions encoded in step 800. Thus, the sequence of marks laser machined on the surface match the encoded sequence of directions and may represent the data.

Figure 9:
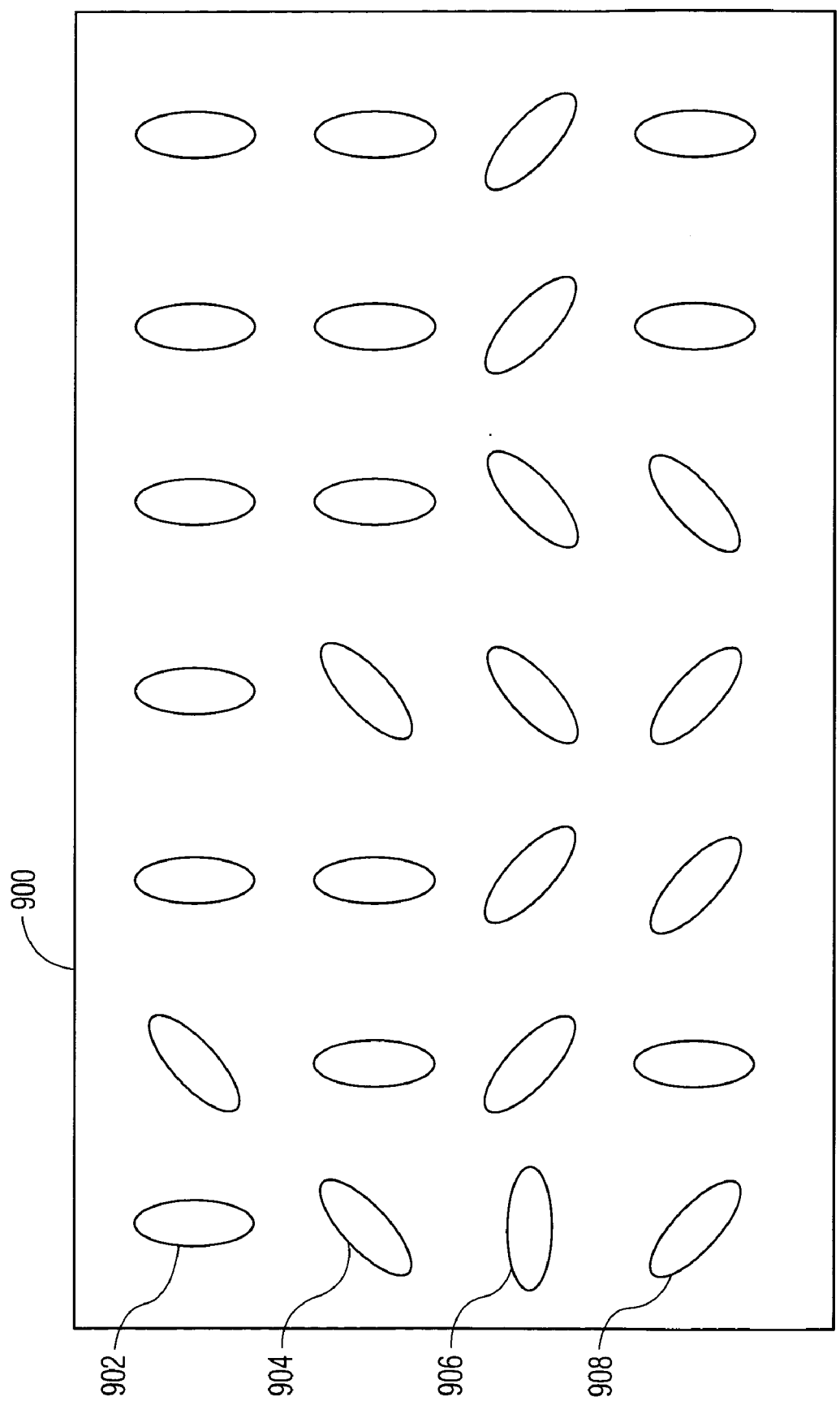
FIG. 9 a schematic representation of exemplary data encoded using the exemplary method of FIG. 8.

To easily correlate the resulting encoded data to common binary codes, it may be desirable for the predetermined number of directions (i.e. number of symbols) in the code to be equal to a power of two (2, 4, 8, etc.), but this encoding scheme is not necessary. FIG. 9 illustrates exemplary data storage by the exemplary method of FIG. 8 using a number of symbols equal to a power of two, in this case 4. Symbols 902, 904, 906, and 908 (which may desirably represent the digits 0, 1, 2, and 3, respectively) are machined on the surface of storage medium 900. Each of these symbols has substantially the same elliptical shape and is aligned in a unique direction. The symbols may be arranged in columns of four, as shown, so that each column may represent one byte of binary data.

Figure 10:
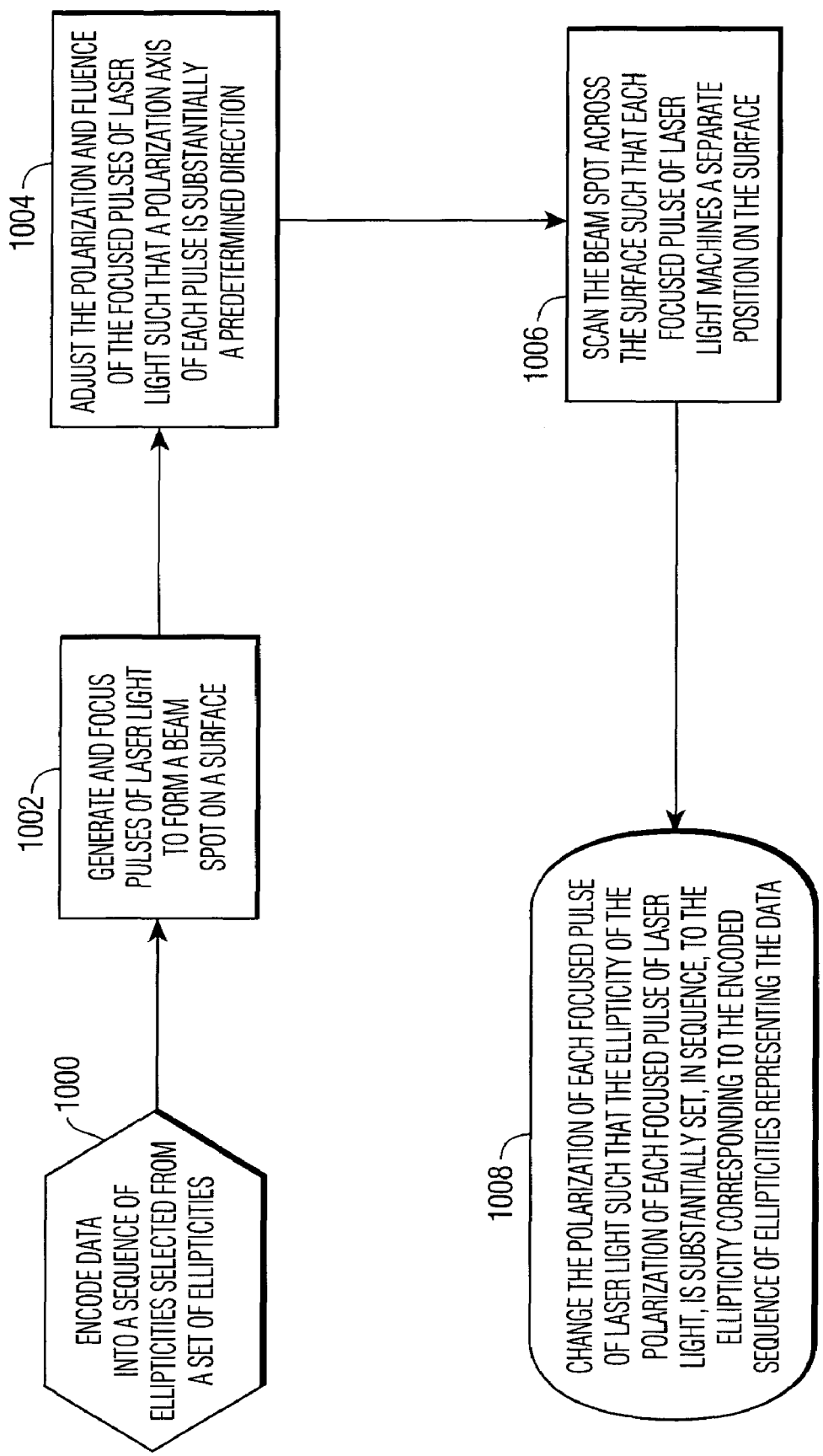
FIG. 10 is a flow chart illustrating another exemplary method of encoding data on a surface using an exemplary laser micro-machining system according to the present invention.

FIG. 10 illustrates an alternative exemplary method for storing data on a surface with marks formed by laser machining. As in the exemplary method of FIG. 8 each of the marks has an elliptical shape, but in this exemplary embodiment the data is encoded by varying the ellipticity rather than the direction of the major axis of the elliptical shapes.

The data is encoded into a sequence of directions (symbols) selected from a predetermined number of ellipticities, step 1000. Pulses of laser light are generated and focused to form a beam spot on the surface where the data is to be stored, step 1002. The polarization and fluence of the focused pulses of laser light incident on the surface are adjusted such that each pulse of laser light has a polarization ellipse with its polarization major axis aligned to the predetermined direction, step 1004.

The beam spot is scanned across the surface so that each focused pulse of laser light machines a separate position on the surface, step 1006. As each pulse of laser light, in sequence, is focused onto the surface, the ellipticity of its polarization ellipse incident on the surface is changed, step 1008, such that its polarization ellipticity is substantially set to correspond to the next one of the sequence of ellipticities encoded in step 1000. Thus, the sequence of marks laser machined on the surface match the encoded sequence of directions and may represent the data.

Figure 11:
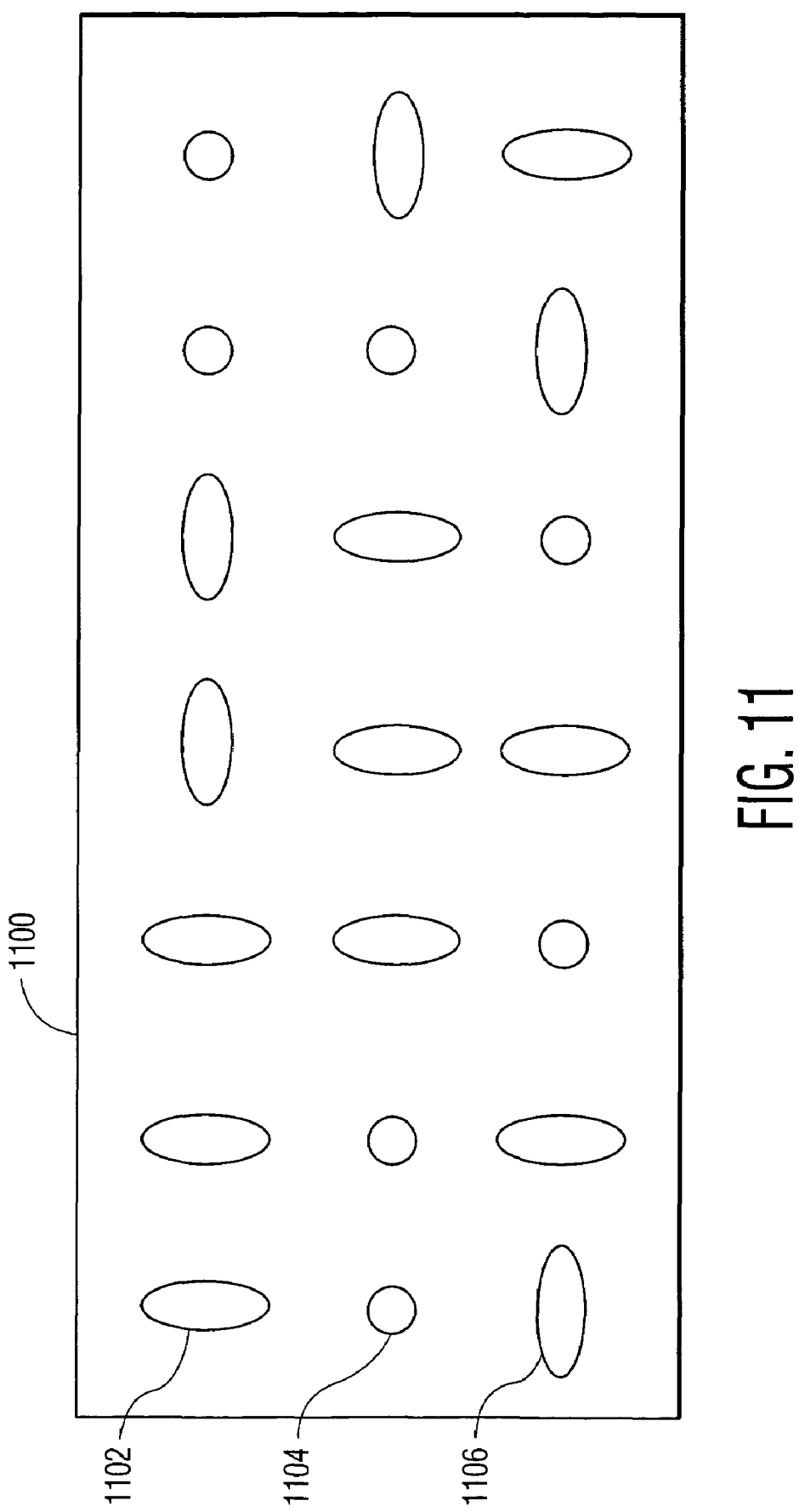
FIG. 11 a schematic representation of exemplary data encoded using the exemplary method of FIG. 10.

FIG. 11 illustrates exemplary data storage by the exemplary method of FIG. 9 using three symbols corresponding to ellipticities of 1, 0, and −1. Symbols 1102, 1104, 1106, and 1108 (which may desirably represent the digits 0, 1, and 2, respectively) are machined on the surface of storage medium 1100.

The present invention includes a number of methods for laser machining features using pulses of laser light having variable polarization characteristics. Such techniques may help to expand the areas of use for laser micro-machining. Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for controlling a shape of an area laser machined by a pulse of laser light on a surface of a workpiece to be a predetermined elliptical shape with a predetermined major axis aligned in a predetermined direction, the predetermined major axis having a predetermined major axis length less than or equal to a diameter of a beam spot of the pulse of laser light, the method comprising the steps of:

a) generating the pulse of laser light;

b) focusing the pulse of laser light to the beam spot within a target area of the microstructure workpiece such that the pulse of laser light has a substantially circularly symmetric beam intensity profile at the beam spot;

c) adjusting a polarization of the pulse of laser light such that in the beam spot the pulse of laser light is elliptically polarized and an axis of a polarization ellipse of the pulse of laser light is oriented in the predetermined direction, the polarization ellipse having a major axis different from a minor axis, while maintaining the substantially circularly symmetric beam intensity profile of the pulse of laser light at the beam spot;

d) adjusting an ellipticity of the polarization of the pulse of laser light such that the pulse of laser light has contours of constant machining capacity on the surface of the microstructure workpiece, the constant machining capacity contours having a substantially similar shape to the predetermined elliptical shape, while maintaining the substantially circularly symmetric beam intensity profile of the pulse of laser light at the beam spot; and e) controlling fluence of the focused pulse of laser light in the beam spot such that the area of the surface of the workpiece laser machined by the pulse of laser light is substantially the predetermined elliptical shape.

2. The method according to claim 1, wherein the diameter of the beam spot is substantially diffraction limited.

3. The method according to claim 1, wherein step (c) includes adjusting the polarization of the pulse of laser light such that, in the beam spot, the pulse of laser light is linearly polarized in the predetermined direction.

4. The method according to claim 1, wherein the beam spot is focused in step (b) such that the pulse of laser light has a Gaussian 0,0 beam intensity profile at the beam spot.

* * * * *